July 29, 1969          H. AULER          3,458,176
EQUIPMENT FOR THE INTRODUCTION OF GASES INTO FLUIDS
Filed May 31, 1966          3 Sheets-Sheet 1
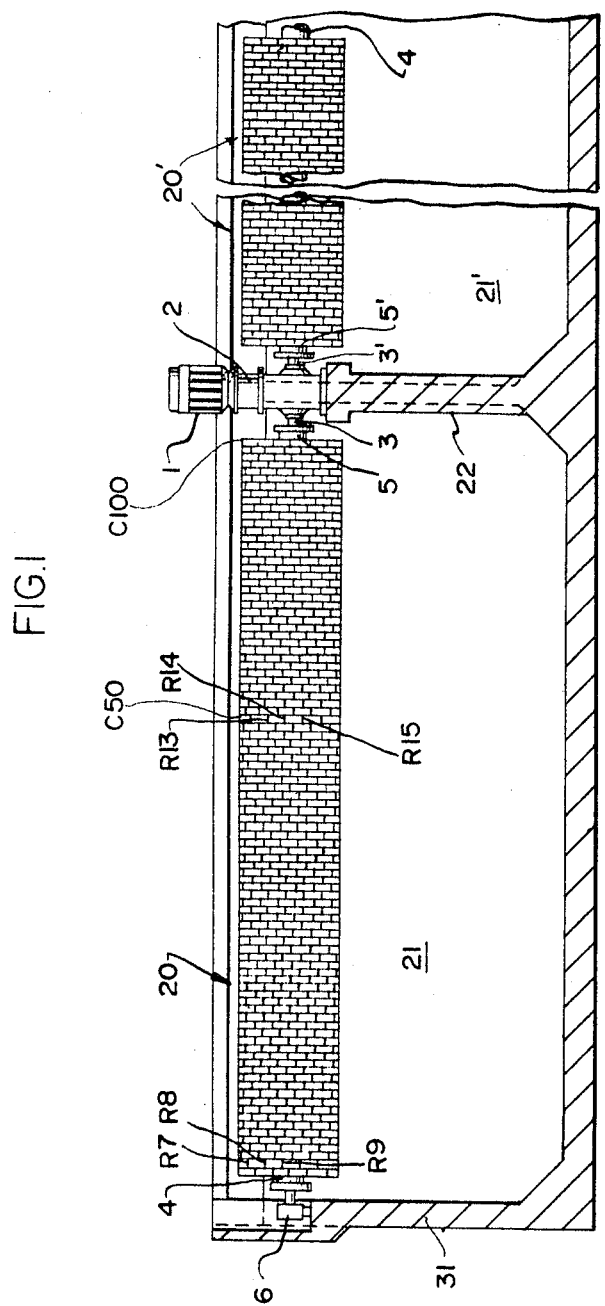
INVENTOR
HERBERT AULER
BY Petherbridge, O'Neill & Aubel
ATTORNEYS July 29, 1969    H. AULER    3,458,176
EQUIPMENT FOR THE INTRODUCTION OF GASES INTO FLUIDS
Filed May 31, 1966    3 Sheets-Sheet 2

INVENTOR
HERBERT AULER
BY Petherbridge, O'Neill & Aubel
ATTORNEYS

United States Patent Office 3,458,176
Patented July 29, 1969

3,458,176
EQUIPMENT FOR THE INTRODUCTION OF GASES INTO FLUIDS
Herbert Auler, Haus am Huttenwald, Germany, assignor to Passavant-Werke, Michelbacher Hutte, Michelbach, Nassau, Germany, a corporation of Germany
Filed May 31, 1966, Ser. No. 553,763
Claims priority, application Germany, July 13, 1965, P 37,242
Int. Cl. B01f 7/04, 3/04
U.S. Cl. 259—130   8 Claims

ABSTRACT OF THE DISCLOSURE

Apparatus for the introduction of gases into liquids, such as used in connection with the aeration of activated sludge or waste material, which includes a rotor carrying a plurality of aeration beater members in cicumferential columns with the beaters in the columns forming rows, each row being at an angle to the longitudinal axis of the rotor. This arrangement minimizes thrust peak loadings on the rotor assembly because beating members strike the water at spaced intervals rather than as a unit.

---

This invention relates to new and improved apparatus and methods for introduction of gases into fluids, for example of oxygen into waste water for aeration of the waste water, and is more particularly directed to such apparatus including at least one rotor device carrying a plurality of radially extending and circumferentially oriented beater elements, paddles, shovels, rods or the like.

In prior art rotor devices of this type, the beater elements or shovels were arranged circumferentially about the periphery of the shaft of the rotor device in vertical columns and horizontal rows with corresponding shovels in each row being located in a vertical plane extending from the longitudinal or horizontal axis of the rotor device.

The prior art construction of such rotor devices has several disadvantages, the most notable disadvantages being that, with corresponding shovels arranged in such horizontal rows, all of the shovels in each row would simultaneously strike the water in the waste water tank and create thereby relatively high peak thrust impulse waves which would be transmitted in the form of torsion stresses to the rotor parts. Thus, the size and design of prior art devices was severely limited by the magnitude of the torsion effects of such thrust impulses on the parts of the rotor device.

With the present invention, these problems and disadvantages of the prior art, among others, are substantially overcome by the provision of a rottor device in which the beater elements or shovels are arranged in a novel manner relative to each other in vertical columns and horizontal rows so that, while the frequency with which the beater elements or shovels strike the water within a given time period is increased, the torsional effects of the thrust impulses caused by such striking on the rotor device parts are reduced. Furthermore, with the present invention, various flow circulation patterns in the water in a tank may be created and controlled and with enhanced aeration of the water. Moreover, rotor devices constructed in accordance with the present invention may be larger in diameter and length than rotor devices heretofore constructed, may operate at greater rotational speeds than prior art devices and with reduced power demands, and may be of more economical, simpler, lighter-weight and lighter-strength construction facilitating maintenance.

It is, therefore, an object of the present invention to provide new and improved aeration rotor devices.

Another object of the present invention is to provide new and improved aeration rotor devices which may be constructed in sizes heretofore considered technically and economically inefficient.

Still another object of the present invention is to provide new and improved rotor devices of increased size which are operable at high rotational speeds.

A further object of the present invention is to provide new and improved rotor devices which are of large size and operable at high rotational speeds about a horizontal axis.

A still further object of the present invention is to provide new and improved aeration rotor devices which enhance aeration of water and the like.

Another object of the present invention is to provide new and improved aeration rotor devices which reduce the torsion effects of the rotor parts of the striking of the beater elements or shovels of the rotor device on water or other liquid.

Still another object of the present invention is to provide new and improved aeration rotor devices with reduced power demand for operation of the device, which permits cheaper and simpler construction and which facilitates maintenance while reducing the cost of such maintenance.

A further object of the present invention is to provide a new and improved aerator rotor device having radially extending beater elements or shovels arranged in vertical columns and horizontal rows with a predetermined orientation of the shovels in the columns and rows.

A still further object of the present invention is to provide new and improved aeration rotor devices capable of controlling the direction of circulation of fluid, such as waste water in a circulation basin or tank.

Yet another object of the present invention is to provide new and improved methods for introduction of gases into fluids, such as oxygen into waste water.

Another object of the present invention is to provide new and improved methods for controlling the direction of circulation of fluids in a tank or basin.

These and other objects, features and advantages, among others, of the present invention will become readily apparent from a careful consideration of the following detailed description, when considered in conjunction with the accompanying drawings illustrating preferred embodiments of the present invention wherein like reference numerals refer to like and corresponding parts throughout the several views and wherein:

FIGURE 1 is a view in partial vertical section of a pair of basins or tanks each utilizing an aeration rotor device constructed in ccordance with the principles of the present invention;

Figure 3:
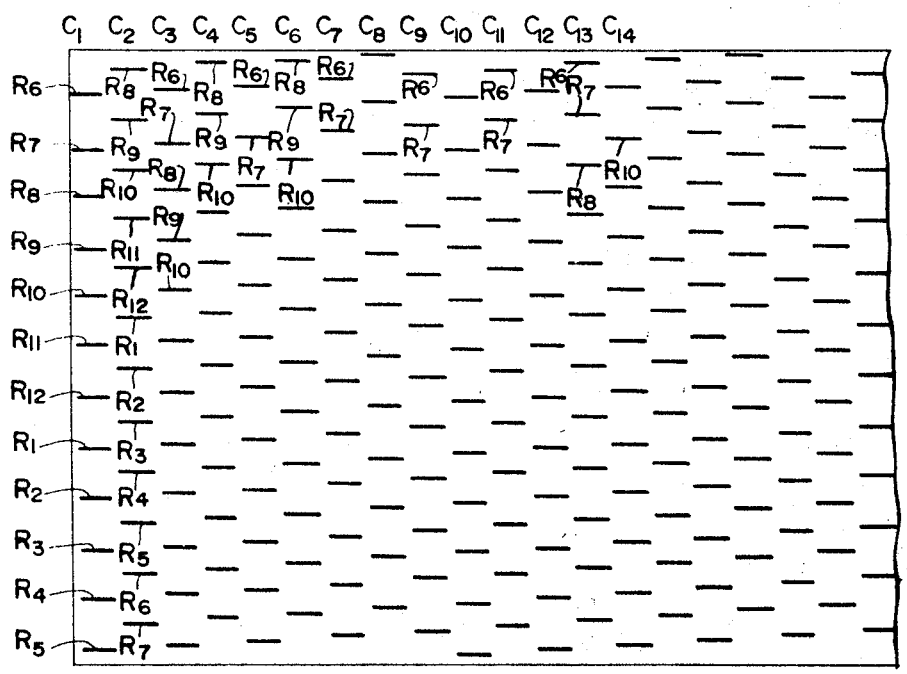
FIGURE 3 is a diagrammatic developed view of part of an aeration rotor device constructed in accordance with the principles of the present invention.

Although the present invention has a variety of applications, FIGURE 1 illustrates a preferred embodiment thereof in a system for aeration of waste water.

In each of a pair of open-topped basins or tanks 21 and 21' are located an aeration rotor device 20 and 20', respectively, constructed in accordance with the present invention. The rotor device 20 is driven by conventional drive motor means 1 mounted on a vertical column 2 located on a wall 22 which is common to both tanks 21 and 21'. The column 2 houses drive gear means (not shown) for driving a horizontal stub axle 3 which is connected through a coupling 5 to a horizontally disposed hollow shaft 4 of the rotor device 20 for causing rotation thereof. At its end opposite the wall 22, the shaft 4 of the rotor device 20 is supported for rotation in bearing means 6 located in an end wall 31 of the tank 21.

It will be appreciated that, for each aeration device 20 and 20', separate drive means 1 may be provided, or, as shown in FIGURE 1, the two aerator devices 20 and 20' may be driven by a single motor 1 in which case the shaft 4' of the device 20' is then connected through gearing means (not shown) with a stub axle 3' by a coupling 5' and is supported in a terminal bearing (not shown) in the wall (not shown) of the basin 21' opposite the common wall 22 of the basins 21 and 21'. It will also be appreciated that the shafts 4 and 4' of FIGURE 1 may be driven in similar or opposite directions depending on the type of drive gearing used.

The aeration devices 20 and 20' are similar in construction and operation and, therefore, except where indicated otherwise herein, the description of the construction and operation of the device 20' is to be considered to be the same as the construction and operation of the device 20.

To form the rotor devices 20, the hollow shaft 4 is provided with a plurality of spaced radially extending aeration beater elements or shovels, such as shovels R7, R8 and R9 (FIGURE 2) which are arranged circumferentially about the periphery of the shaft 4 in columns, such as columns C1 through C14 shown in FIGURE 3 for purposes hereinafter more fully described.

The shovels R7, R8 and R9 in each column may be of any configuration and each column may be formed of a plurality of joined flat irons V-shape curved in cross section (FIG. 2) and the columns may be assembled on the shaft 4 as a plurality of "aeration stars," such as the "aeration stars" disclosed in U.S. Patents No. 3,115,334.

Figure 2:
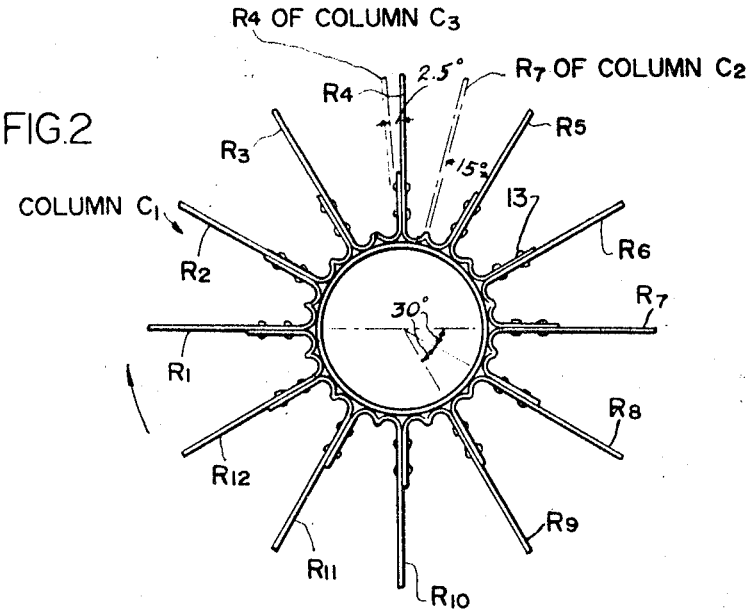
FIGURE 2 is an end view of a rotor device of FIGURE 1 and showing one column of aeration shovels to facilitate illustration and description.

As shown in FIGURE 2, each of the shovels R1–R12 in each column radiates from a common point on the horizontal or longitudinal axis of the shaft 4 and at an angle from each of the two adjacent shovels. For example, the "aeration star" shown in FIGURE 2 includes 12 individually numbered shovels. Shovel R8 radiates from the center point on the axis of the shaft 4 at an angle, for example, of 30 degrees, to both shovels R7 and R9. It will also be observed that a pair of shovels, for example shovels R1 and R7, in each "star" or column are axially aligned, as are shovels R8 and R2; shovels R9 and R3, and so on.

In accordance with the present invention and as illustrated in FIGURE 3, correspondingly numbered shovels, e.g., shovels R1, R2 . . . R12, in each column, e.g., columns C1, C2 . . . C14, are located in different axial radial planes which each extend through the axis of rotation of the rotor shaft in the longitudinal direction. Shovels in different columns are angularly oriented to each other in such a manner that, when compared to the orientation of the shovels in the columns of a prior art rotor device, i.e., an orientation in which correspondingly numbered shovels in each of the columns are located in the same axial plane or in a horizontal row, the frequency of immersion of individual shovels in the water over a given time period is increased but the magnitude of the initial peak impulse created by the shovels is reduced. Thus with the present invention, the torsion effects created by individual shovels on those parts of the rotor device under torsion stress are correspondingly reduced, and, with a reduction in the torsion effects on such parts of the rotor device, the devices may be operated at higher speeds; may be of greater diameter and length than prior art rotor devices; may be constructed with simpler, lighter weight and lower strength parts, and may be operated with lower power demands.

For example, the hollow shaft 4 of the rotor device 20 may be constructed so as to have a diameter equal to more than one fourth of the "total" diameter of the aeration rotor device 20, assuming that the "total" diameter of the aeration rotor device 20, is equal to the diameter of the shaft 4 and the length of each of the two shovels disposed on a straight line bisecting the rotor shaft 4 and a pair of shovels, for example, shovels 1 and 7 in FIGURE 2. Thus, for municipal waste treatment installations, the diameter of the shaft 4 may be within the range of from about 300 mm. to about 400 mm. and preferably in the range of from about 350 mm. to about 360 mm. The length of each of the aeration shovels 7, 8 or 9 may be within the range of from about 300 mm. to about 400 mm. and preferably in the range of from about 300 mm. to about 350 mm.

Accordingly, a rotor device 20 can be constructed to have "total" diameter equal to approximately 1000 mm. from the outer edge of one of the shovels, for example, shovel 7 shown located at the right of the shaft 4 in FIGURE 2, to the outer edge of the shovel 1, shown to the left in FIGURE 2.

It will be appreciated that, with a rotor device with a diameter of these dimensions, a low torque effect on the rotor shaft will be produced and, therefore, a high rotational speed for the introduction of an adequate volume of oxygen into the waste paper can be achieved.

Moreover, the rotor device 20 may be provided with a length along its rotational axis of from about 4.5 m. to about 10 m., and, if desired, rotor devices of greater diameters and lengths may be constructed in accordance with the present invention.

To illustrate the shovel angular orientation feature of the present invention, reference is made to FIGURE 3 wherein each vertical column, for example, columns C1 through C14, is an "aeration star" (FIGURE 2) having 12 shovels thereon, the shovels being consecutively numbered R1 to R12 in column 1. Assume further that the twelve shovels in each other column, column C2–C14, are correspondingly numbered R1 to R12.

In the prior art rotor design, the corresponding shovels R1–R12 in each column C1 through C14, etc. would be aligned in the same axial radial plane with respect to the longitudinal axis of the rotor as would be each shovel R1–R12 in every other column to form twelve spaced horizontally extending rows. Thus, the corresponding shovels R1 in each column C1–C14 would form a horizontal row, row 1, located in one axial plane and each shovel R2 in each column C1–C14 would form a row, row 2, located in another vertical plane with each row, row 1, row 2, therefore, being in 12 different vertical planes with respect to the longitudinal axis of the rotor device. As the prior art rotor device was rotated about its longitudinal axis or was moved downwardly, as viewed in FIGURE 3, all of the shovels R1 in each of the columns C1–C14 (row 1) would simultaneously strike the water in the water basin creating an initial thrust impulse peak which would transmit a total initial torsion force peak T1 to the parts of the rotor subject to torsion stress, and, as the shovels in row 1 continue to move through the water in the basin a lower torsional force $T_w$ was transmitted to the parts of the rotor device. Then, as the shovels R2 in row 2 would simultaneously strike the water in the basin a second initial total thrust impulse peak T2 would be created and would be transmitted as torsion forces to the rotor device. Between the two initial thrust impulse peaks, $T_1$ and $T_2$, created, respectively, by the shovels in row 1 and row 2 and between such peaks in the other rows, row 3 . . . R12 created by the simultaneous striking of the water by the shovels existed uniform time gaps of low thrust when the shovels in each row were moving through the water. Thus, the high initial thrust impulse peaks of each row of shovels of prior art rotor devices striking the water in the basin create high torsion force peaks, and, thus, high torsion force peak effects on the parts of the rotor subject to force torsion effects.

In accordance with the present invention, the possibility of creation of high initial thrust impulse peaks and thus induced high torsion force peaks on parts of the rotor device of the prior art are substantially eliminated by aranging the shovels in each row with respect to the correspondingly numbered shovels in the other rows so that a large number of shovels do not simultaneously strike the water. Also in accordance with the present invention, the frequency with which individual shovels strike the water is increased, but the magnitude of the thrust impulses created by shovels striking the water is decreased and the time gap between the frequency of striking of shovels may be eliminated or at least substantially reduced.

In accordance with the present invention, the shovels, R1–R12, in each column, C1–C14 (FIGURE 3) are located in radial planes extending from a common line coincident with the longitudinal axis of the rotor, each of which planes are at a predetermined angle to each other, for example, each of the 12 shovels R1–R12 are shown in FIGURE 2 in column C1 as being located in a different plane extending at an angle of 30° from each of the adjacent shovels in the same column. This angle between adjacent shovels in the same column may be referred to as a "first angle."

The shovels R1–R12 in column C1 (FIGURE 3) are for purposes of discussion considered to be reference shovels. The shovel R1 in column C2 of FIGURE 3 is rotated upwardly as viewed in FIGURE 3 or about the longitudinal axis of the rotor device 20 with respect to the corresponding shovel R1 in column C1 so that the axial radial plane in which the shovel R1 of column C2 is located is transposed or offset at a multiple of a 15% angle, say 75% from the axial radial plane in which the corresponding shovel R1 of column C1 is located. This angle between axial planes containing shovels R1 in adjacent odd to even numbered columns, such as columns C1 and C2, may be referred to as a "second angle." Correspondingly, the shovel R2 in column C2 is rotated about the longitudinal axis of the rotor device 20 with respect to the corresponding shovel R2 in column C1 so that the axial radial plane in which shovel R1 of column C2 is located is transposed or offset at the same angle from the axial radial plane in which the corresponding shovel R2 of column C1 is located. Similarly, corresponding shovels R3, R4 . . . R12 of column C2 are offset the same angular amount from the corresponding shovels R3, R4 . . . R12 of column C1. The shovels R1–R12 in column 3 are also rotated upwardly as viewed in FIGURE 3 or about the longitudinal axis of the rotor device 20 so that the axial radial planes in which the shovels R1–R12 of column 3 are located are offset or transposed at an additional angle of, for example, 2.5° from the vertical planes in which the corresponding shovels R1–R12 of not only column C2 but of C1 are located. Therefore, if the shovels in each column are separated by 30% (fiirst angle) and the corresponding shovels in columns C1 and C2 are offset by 75% (second angle), corresponding shovels in columns C1 and C3 are offset by an additional 2.5 degrees while corresponding shovels in columns C2 and C3 are offset by 72.5 degrees as shown in FIGURE 3. This angle between corresponding shovels in adjacent even to odd numbered columns, such as columns C2 and C3 (72.5 degrees in this example) may be referred to as a "third angle."

Thus, each of the shovels R1 to R12 in column C3 are rotated upwardly as viewed in FIGURE 3 or about the longitudinal axis of the rotor device so that each of the shovels R1–R12 in column C3 is located in an axial radial plane which is transposed or offset a minor angle distance, for example 2.5° from the correspondingly numbered shovels in not only column C2 but column C1.

In column 4 of FIGURE 3, the shovels R1–R12 are rotated upwardly or about the longitudinal axis of the rotor device so that the axial radial planes in which the shovels R1–R12 of column 4 are located are offset or transposed at an additional angle of 2.5° from the axial planes in which the shovels R1–R12 of, not only column 1, but of column C2 are located in the same manner as explained above. Therefore, using the same value for the value for the first and second angles, 30% and 75%, respectfully, corresponding shovels in columns C1 and C4 would be offset by 77.5 degrees; in columns C2 and C4 by 2.5 degrees; in columns C3 and C4 by 75 degrees. The shovels R1–R12 in the odd columns, columns C5, C7, C9, C11 and C13 are similarly transposed in axial planes from the axial planes of the correspondingly numbered shovels in the preceding odd numbered columns at the same angle of 2.5°. Similarly, the shovels R1–R12 in the even numbered columns, columns C6, C8, C10, C12, are transposed from the axial planes of the correspondingly numbered shovels in the preceding even numbered columns at the same angle of 2.5°.

Using as the angle of transposition of 2.5° between correspondingly numbered shovels in the odd columns and the same angle of transposition between correspondingly numbered shovels in even columns, the shovels R1–R12 in column C13 of FIGURE 3 will be located in the same axial radial planes as shovels R1–R12 of column 2; however, shovel R10 in column C2 will be in the same axial radial plane as shovel R8 of column C13. Similarly, the shovel R7 in column C3 of FIGURE 3 will be in the same axial radial plane as the shovel R10 in column C14. Thus, while shovels in columns C2 and C13 (ard in columns C3 and C14) are located in the same planes, the shovels in the same plane are not correspondingly numbered.

It will be observed that with six columnar transpositions of shovels by 2.5° in the example given a total transposition between the column C1 and column C12 will have occurred whereby shovel R7 in column C1 is moved from the axial plane in which it is located in column 1 to the next plane 15° therefrom so as to be in the same axial plane as shovel R10 in column 12. Therefore, the shovels in the columns following column 12 will strike the water in a basin together with corresponding shovels in the first twelve planes, column 46 should strike simultaneously with column C2 shovels, column C4 shovels with column C37 shovels, etc. to minimize the initial thrust impulse peaks of the rotor device while increasing the frequency of striking of the shovels.

Advantageously, the total number of axial radial planes in which the shovels are located and the total number of shovels in each column are a multiple of 12, so that no time gaps exist between striking of shovels with the water to minimize the thrust impulses. And it has been found that the transposition angle of 2.5° is generally sufficient to avoid the creation of high initial thrust impulse peaks. In addition, use of such angle of transposition promotes a desirable screw or eddy currents type circulation pattern in the water as more fully discussed hereinafter.

It will also be appreciated that the common transposition angle between adjacent shovels in different columns can be made smaller so that this transposition angle is equal to the angle between adjacent shovels in each column. For example, if the first angle between shovels in each column is 15° and 100 columns of 24 shovels each were carried by the rotor, the transposition angle between correspondingly numbered shovels in alternate odd and even numbered columns need only be approximately 0.3°. Thus, the present invention permits the use of any predetermined number of columns with any predetermined number of shovels in each column and with any desired transposition angle between corresponding shovels in alternate odd and even numbered columns particularly when the correspondingly numbered shovels in each column from one end to the other of the rotor device are to be offset by a transposition in the same direction transposed across the length of the rotor device.

It will also be appreciated that the transposition angle between shovels in alternate odd and even numbered columns may be utilized in the same direction for a predetermined number of columns, for example, downwardly from left to right from column 1 through column 50 in FIGURE 1 and the angle of transposition may be changed to run upwardly from left to right or in the opposite direction from column 51 to column 100 in FIGURE 1. The shovels with such a change in the angle of transposition, therefore, can be said to form in FIGURE 1, an arrow shaped arrangement wherein shovels R13, R14 and R15 in column 50 form a type of arrow point or apex for the arrangement. With employment of 12 shovels per column in this arrangement, the shovels in alternating columns could be transposed by about 0.5° in the bank of columns to the left side of column 50 and by about one degree in the bank of columns on the right side of column 50 so that shovels which continuously immerse in or strike the water without providing a time gap between immersions of individual shovels.

Preferably the angle of transposition between adjacent shovels in different columns is equal to any angle up to about 3°, so that shovels in different columns in the example of a rotor device given herein can be oriented to be located in the same axial radial plane and so that the sum of these angles of transposition is equal or is a small complete multiple of the angle between shovels in the two adjacent odd and even columns. With such an arrangement, the immersion or striking frequency of the shovels in the water is increased, but the thrust impulse peaks are reduced. Thus, the shovels of different columns in one plane extending axially along the horizontal axis of the rotor device of FIGURE 3 immerse in or strike the water at very short time intervals from the immersion of the next group of shovels in the next plane extending axially along the horizontal axis of the rotor device of FIGURE 3, so that no interruption in the immersion frequency of the shovels need occur.

Moreover with the present invention, several shovels located at substantial distances from each other can be aligned in such an axial radial plane to so immerse simultaneously. Furthermore, other immersion frequencies than those described above may be chosen, and the immersion frequency may be varied by banks of the columns in the rotor device. In addition the shovels can be rotated about their axial radial planes, for example, to change the angle at which one or the other of the sides of the shovel first strikes the water.

Also with use of the present invention, improved introduction of oxygen into the waste water is achieved. The lens shaped bubbles developed by repeated striking of the shovels at a high frequency during operation of the rotor devices of the present invention are very small, whereby a finer bubble aeration than heretofore possible is achieved.

Figure 4:
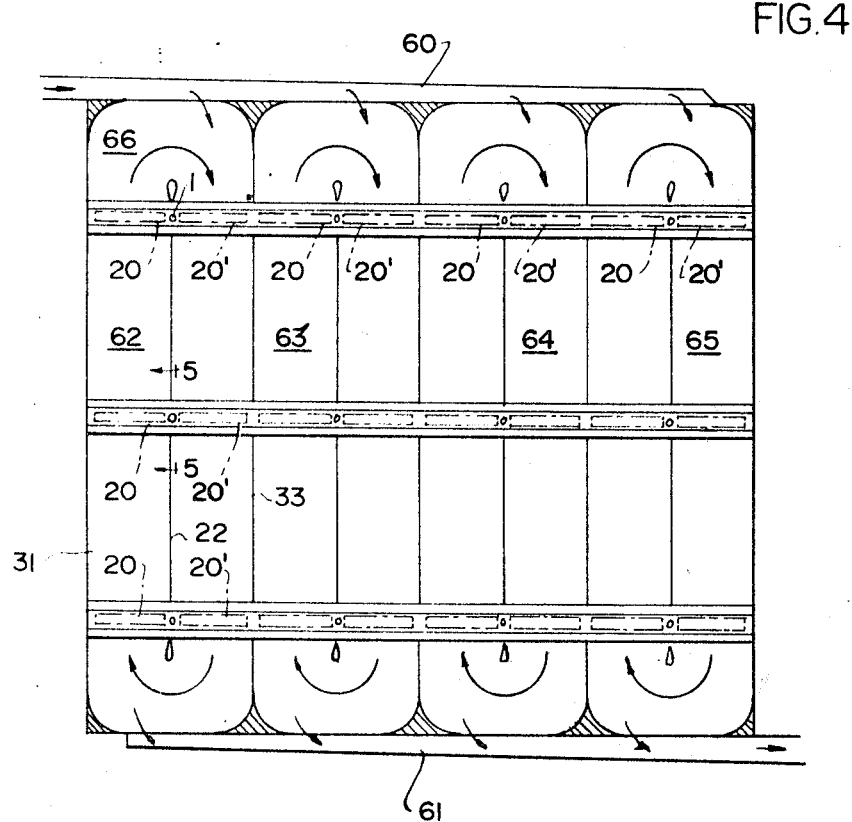
FIGURE 4 is a generally schematic view of a plurality of circulation basins each employing a plurality of pairs of aeration rotor devices of FIGURE 1 in accordance with this invention.
Figure 5:
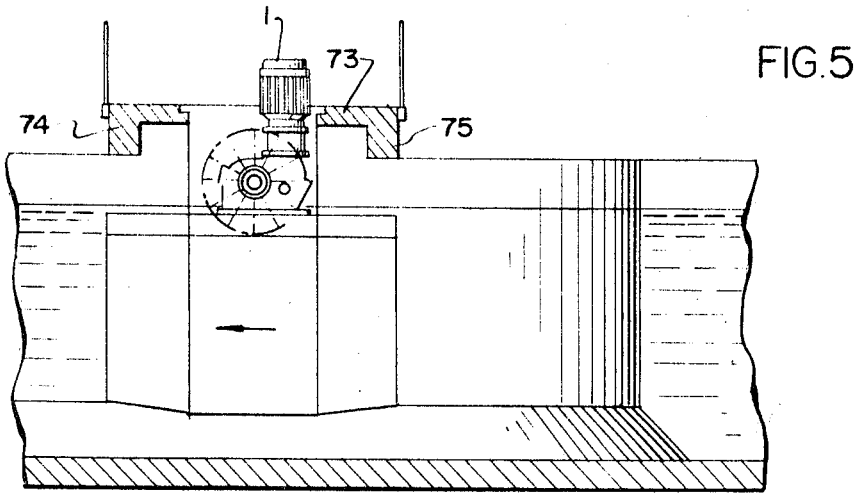
FIGURE 5 is a view taken along line 5—5 of FIGURE 4 and broken to facilitate illustration.

In the waste water treatment system, prior art aeration rotor devices caused the water to flow in a mean direction which was located in a vertical plane with respect to the longitudinal axis of the rotor device (or normal to the longitudinal axis of the rotor shaft, as indicated by the straight arrows in FIGURE 5). Moreover, by a predetermined orientation of the shovels on the rotor devices, a screw type or eddy currents type circulation pattern can be produced in the fluid in the tank to enhance either mixture of the contents in the basin or tank, for example, to mix the gas loaded fluid layers in the basin or tank or to circulate the contents of the effluent ditch supplying a plurality of basins or tanks by circulation in a curved pattern from one tank to the other, as indicated by the curved arrows in FIGURE 4.

A variety of fluid flow circulation patterns can be produced by utilizing rotor devices constructed in accordance with the present invention. For example, the shovels of one rotor device which are located in a predetermined number of columns at one end of the rotor device can be oriented with respect to the shovels located in a predetermined number of columns at the opposite end of the rotor device so as to produce a predetermined mean directional flow for the total fluid circulation pattern for the rotor device. Thus, the shovels can be oriented so that the mean direction of the total fluid flow circulation pattern is across the longitudinal axis of the rotor from one end to the other, either to the right or left as viewed in FIGURE 5. In addition, the shovels at one end of the rotor device can be oriented with respect to the shovels at the other end of the rotor device to provide a converging mean direction from the total fluid flow circulation pattern, or the shovels at opposite ends of the rotor device can be oriented with respect to each other to provide a diverging mean direction of the total flow circulation pattern. A diverging flow may be advantageously utilized for circulating fluid located in remote or calm corners of the basin, and converging flow may be advantageous by use, for example, where the basis walls are inset or relieved or where intensive mixing in the center of the basin is desired. Moreover, it is possible to orient, in accordance with the present invention, only the shovels located in a portion of the columns at one end of the rotor device; to orient only shovels in columns at both ends of the rotors to provide converging, diverging, or parallel flow circulation patterns adjacent selected portions of the rotor, or to orient shovels in selected columns with respect to each other to produce a number of diverging and converging flow circulation patterns, for example, to enhance mixing.

As mentioned above, the individual shovels in a predetermined number or bank of columns may also be offset at an angle to the longitudinal axis of the rotor shaft, e.g., vertically at an angle to the horizontal axis of the rotor appearing in FIGURE 3.

In addition to controlling the mean direction and power force of the circulating fluid by the relationship of the shovels on a single rotor device, a pair of rotor devices may be employed for this purpose.

In FIGURE 4 are shown a plurality of pairs of coaxially aligned rotor devices 20 and 20'. By orienting the shovels on the rotor 20 a screw type flow circulation pattern can be developed, whereby the mean direction of flow of the fluid in the chamber 66 can be in a curved direction, as indicated by the curved arrow in chamber 66. This flow pattern can be developed by orientation of the shovels on the rotor device 20 as indicated above. The rotor device 20' can also have its shovels oriented in the predetermined relation to the orientation of the shovels of the rotor device 20 and can be rotated in a direction opposite to the direction of rotation of the rotor device 20 to cooperate with the rotor device 20 to facilitate movement of the fluid in selected mean direction in the tank 62.

It will also be appreciated that a pair of rotor devices can be oriented with respect to each other at angles to the walls 31 and 33 or a single rotor device can be oriented at an angle to the walls 31 and 22, if desired. Moreover, the shovels on a pair of rotor devices in a chamber, such as chamber 62, can be oriented with respect to each other in accordance with this invention to change the mean direction of flow in the tank 62 a number of times, for example, to enhance mixing.

Thus, the mean direction and power force of the circulating fluid can be controlled primarily by the relationship of the shovels in particular columns on a single rotor device.

Furthermore, a common drive motor, can be employed to drive a pair of coaxially aligned rotor devices in the tank 62. In the arrangement shown in FIGURE 4 one rotor device 20 is located on one side of the common wall 22 and the other rotor device 20' is located on the other side of the common wall 22. The rotor devices can be driven in the same direction or, as indicated in FIGURE 4, in opposite directions. In order to obtain a uniform screw type flow pattern around the wall 22 through chamber 66, the shovels of coaxial rotor devices are transposed in the same direction. To enhance circulation in front of the drive mechanism, it is preferable that the shovels on the two coaxially aligned rotor devices be transposed in opposite directions.

Thus, with the present invention, a single rotor device or two or more rotor devices may be employed to change the mean direction fluid circulation in a tank by orientation of the shovels on the rotor device or rotor devices.

When utilizing one or more rotor devices constructed in accordance with this invention, separate pass or walk ways 73 as shown in FIGURE 5 may be employed, and the walk ways 73 may be so constructed as to serve as a top cover for the drive mechanism for the rotor devices to protect the drive mechanism from water spray developed during operation of the rotor devices. The passageways 73 have downwardly extending spaced sides as at 74 and 75 which are located adjacent the water level in the tank. Cover means (not shown) may also be employed to protect the drive mechanism.

Thus, with the present invention new and improved rotor devices are provided which minimize the causes of torsion forces on the rotor devices and provide means for controlled circulation of a fluid in a variety of directions.

Although, various modifications and alterations of the present invention will be readily apparent to those versed in the art, it should be understood that what is desired to be embodied within the scope of the patent warranted hereon, are all such embodiments as reasonable and properly fall within the scope of the contribution to the art hereby made.

I claim:

1. Apparatus adapted for introduction of gases into fluids, such as oxygen into waste water, including a rotor device adapted for horizontal rotation adjacent the surface of a fluid carrying along the longitudinal axis thereof at least three columns, each column including a plurality of circumferentially arranged, radially extending shovels, each shovel in each column located in a different axial radial plane, each said plane spaced a first angle from the plane containing an adjacent shovel in the same column, each shovel in each column transposed by a predetermined second angle relative to the corresponding shovel in the axial radial plane of at least one adjacent column, and preselected shovels in each column being disposed in axial radial planes transposed by a predetermined third angle from pre-selected shovels in at least one adjacent column to define spiral rows of shovels extending helically along said axis whereby the number and immersion frequency of said shovels is controlled to reduce the shovel's striking thrust impulse peaks on said device.

2. The apparatus of claim 1, wherein the difference between said second and third angles is less than about 3 degrees.

3. The apparatus of claim 1, wherein said third angle is zero degrees.

4. The apparatus of claim 1 wherein said second angle is less than about 3°.

5. The apparatus of claim 1 wherein said third angle is less than about 3°.

6. The apparatus of claim 1 where said first and second angles are multiples of said third angle.

7. Apparatus of claim 1 wherein corresponding shovels in columns in one portion of the rotor device are each displaced by said second angle in one circumferential direction relative to the longitudinal axis of the rotor device as viewed from one end thereof, and corresponding shovels in the columns in another portion of the rotor device are each displaced by said second angle in the opposite circumferential direction relative to the longitudinal axis of the rotor device as viewed from the other end thereof.

8. The apparatus of claim 1 including a second rotor having said shovels in said columns displaced by said first, second and third angles, said second rotor device being rotatable in a direction opposite to the direction of rotation of said first device.

References Cited

UNITED STATES PATENTS 3,109,875 11/1963 Schramm _____ 261—92

FOREIGN PATENTS 906,370 9/1962 Great Britain.
917,112 1/1963 Great Britain.

ROBERT W. JENKINS, Primary Examiner

U.S. Cl. X.R.
259—103; 261—92